United States Patent
Kanda (10) Patent No.: US 8,579,370 B2
(45) Date of Patent: Nov. 12, 2013

(54) STRUCTURE OF SEAT BACK WITH HEADREST

(75) Inventor: Kenji Kanda, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 329 days.

(21) Appl. No.: 13/029,842

(22) Filed: Feb. 17, 2011

(65) Prior Publication Data

US 2012/0212016 A1 Aug. 23, 2012

(51) Int. Cl.
*B60N 2/42* (2006.01)

(52) U.S. Cl.
USPC .................................................. 297/216.14

(58) Field of Classification Search
USPC ........................................ 297/216.14, 216.13
See application file for complete search history.

(56) References Cited

U.S. PATENT DOCUMENTS

| 6,273,511 B1 * | 8/2001 | Wieclawski | 297/216.14 |
| 7,540,562 B2 | 6/2009 | Sekida | |
| 2010/0181812 A1 * | 7/2010 | Nitsuma | 297/216.13 |

FOREIGN PATENT DOCUMENTS

JP 2007-186103 A 7/2007

* cited by examiner

*Primary Examiner* — Milton Nelson, Jr.
(74) *Attorney, Agent, or Firm* — Browdy and Neimark, PLLC

(57) ABSTRACT

A seat back of vehicle seat, on which a headrest unmovable in fore-and-aft direction is mounted, is constructed such that a resilient support member for supporting a back portion of seat occupant is provided therein, and the upper region of that resilient support member is operatively connected, via movable connecting element, with a biasing element. When a rear-end collision occurs, the resilient support member is displaced far backwardly by excessive great load applied thereto from the seat occupant, overcoming a biasing force of the biasing element, thereby causing the biasing element to stretch long, so that the resilient support member with the seat occupant's back portion thereon is displaced backwardly and upwardly under guidance of the movable connecting element so as to quickly bring a head of the seat occupant to a point close to the headrest, prior to the head being directly pressed against the headrest.

6 Claims, 4 Drawing Sheets

STRUCTURE OF SEAT BACK WITH HEADREST

BACKGROUND OF THE INVENTION

1. Field of the Invention

The present invention relates to a seat back structure of vehicle seat provided with a headrest. In particular, the invention is directed to a seat back structure of vehicle seat so designed that, when a rear-end collision occurs, a seat occupants head is brought to a point adjacent to a headrest mounted on the seat back, so that the head is quickly received by the headrest with a minimum impact, to thereby protect a neck of the seat occupant against damage, such as a whiplash injury.

2. Description of Prior Art

For example, the Japanese Laid-Open Patent Publication No. 2007-186103 (JP 2007-186103 A) and the U.S. Pat. No. 7,540,562 disclose a seat back structure with a movable headrest, which is designed for protecting a seat occupant's head against damage in the case of a rear-end collision. In brief, when a rear-end collision occurs, the body of seat occupant is naturally displaced backwardly of the seat under a backward inertia, which in turn applies a corresponding load (or impact load) to a pressure receiving element provided in the seat back. Thus, the pressure receiving element is moved backwardly to cause a headrest to quickly displace forwardly and upwardly to a point adjacent to a head of the seat occupant.

According to this kind of emergency active headrest, a biasing means, or a tension spring for example, is provided between the pressure receiving element and the headrest. Normally, the headrest is biasingly retained by such biasing means toward a lower home position where it receives a head of seat occupant in an ordinary manner. The biasing means in this headrest system, or the tension spring for example, has a predetermined biasing force sufficient to withstand a weight of the seat occupant's upper body portion as well as a normal load applied from that upper body portion, unless an impact load is applied thereto in a rear-end collision case by a greater force than the seat occupants upper body portion weight and the normal load. Hence, only when such great impact load is applied to the seat back, the pressure receiving element is moved backwardly against the biasing force of the tension spring, so that the headrest is displaced from the lower headrest home position in forward and upward directions towards a predetermined upwardly displaced point of headrest.

With such arrangement, upon occurrence of rear-end collision, the headrest is quickly displaced toward a seat occupant' head being concurrently displaced forwardly, thereby insuring to keep a smallest possible space between the seat occupants head and headrest, and therefore it is possible to effectively reduce a degree of subsequent backward inclination of the seat occupant's head, wherein such subsequent backward inclination of seat occupant's head is quickly followed by forward displacement of that particular head under a backward inertia of the seat occupant, as is known. Accordingly, in this prior art, an abrupt backward inclination of the seat occupant's head can be prevented assuredly, and it is possible to minimize injury of his or her neck portion or whiplash injury.

According to both of the foregoing two prior arts (JP 2607-186103 A and U.S. Pat. No. 7,540,562 B2), a substantially flat support member is provided in the seat back frame so as to be disposed anteriorly of the afore-said pressure receiving element in a backwardly inclined manner, such that the upper end of the support member is situated more backwardly than the lower end thereof. This support member is made of a resilient material and adapted for resiliently receiving a back portion of seat occupant via a padding placed on the frontal surface of that support member. Further, in both of the two prior arts, a pair of rotating links are rotatably secured to the two lateral frame members of the seat back frame, respectively, and a support shaft, on which a headrest is fixed, is connected between those two rotating links and also operatively connected the pressure receiving element through transmission and link elements. When a rear-end collision occurs, the upper body portion or back portion of seat occupant is abruptly displaced backwardly under inertia to the seat back and strongly pressed thereagainst, so that a corresponding excessive great load is applied to the support member and transmitted to the pressure receiving element in the seat back, and the pressure receiving element is thereby displaced backwardly. With such backward displacement of the pressure receiving element, the transmission and link elements operatively connected with that pressure receiving element are actuated to cause rotation of both two rotating links, thereby causing the support shaft integral with the two rotating links to rotate upwardly, so that the headrest fixed on the support shaft is quickly displaced upwardly from the lower home position to the predetermined upwardly displaced point. Hence, the headrest is immediately brought to a point adjacent to the seat occupant's head, thereby reducing a space between the headrest and the seat occupant's head to the extent that the previously discussed abrupt backward inclination of seat occupant's head can be prevented, and therefore, an injury of his or her neck portion or whiplash injury can be minimized.

However, the above-described prior-art arrangement of seat back and active headrest has been with the problem that the seat back structure thereof is very complicated with, many mechanisms incorporated therein, hence requiring troublesome and time-consuming processes for assembling the seat back, with highly increasing costs involved, and that the provision of the pressure receiving element not only limits a cushioning degree of the seat back, which does not provide a deep resilient support touch to a seat occupant's back portion, but also makes the seat occupant feel a hard objectionable touch at his or her back portion.

SUMMARY OF THE INVENTION

In view of the above-stated drawbacks, it is a purpose of the present invention to provide an improved structure of seat back in combination with a headrest unmovable forwardly and backwardly of the seat back, which is of a simplified structure wherein a resilient support element for supporting a seat occupant's back portion can be displaced backwardly and upwardly by an excessive great load applied thereto in the case of rear-end collision, to thereby quickly bring a head of the seat occupant to a point close to the headrest, prior to the head being directly pressed against the headrest.

In order to achieve such purpose, a seat back structure in accordance with the present invention is basically comprised of;
  a seat back frame having: an upper frame member on which
    the headrest is mounted; a pair of lateral frame members;
    and a lower cross frame member;
  an elastic seat back padding;
  a resilient support element resiliently supported in the seat
    back frame, the resilient support element being adapted
    to resiliently support the elastic seat back padding as
    well as a back portion of a seat occupant to be seated on
    the vehicle seat, the resilient support element having an upper end portion;
a biasing element having: a first portion disposed at an upper region of the seat back frame in vicinity of the upper frame member of the seat back frame, the first portion being movably connected, via a movable connecting element, with the upper end portion of the resilient support element; and a second portion connected with other region of the seat back frame than the upper region thereof;
the upper end portion of the resilient support element being normally biased by a biasing force of the biasing element to such an extent that the resilient support element is retained at a normal support position for normally supporting the back portion of the seat occupant, with a head of the seat occupant being positioned away a certain distance from the headrest,
wherein, in case of rear-end collision, upon receiving an excessive great load applied via the seat back padding from the seat occupant who is pressed backwardly under inertia against the seat back, the resilient support element is forcibly displaced far backwardly from the normal support position, together with the back portion of the seat occupant, which overcomes the biasing force of the biasing element, thereby causing the biasing element to resiliently stretch to permit the upper end portion of the resilient support element to be displaced backwardly and upwardly, via the movable connecting element, with respect to the seat back frame, so that a head of the seat occupant is brought to a point close to the headrest, thereby reducing the certain distance between the head and the headrest, prior to the head of the seat occupant being directly pressed against the headrest.

As one exemplary mode of the present invention, the biasing element may comprise first and second biasing spring members disposed adjacent to the pair of lateral frame members, respectively. And, the movable connecting element may comprise; a substantially ringed connecting end portion formed in the first biasing spring member; and a first connecting region formed in the upper end portion of resilient support element, the first connecting region being movably engaged with the substantially ringed connecting end portion of first biasing spring member. Further, the movable connecting element may comprise: a substantially ringed connecting end portion formed in the second biasing spring member; and a second connecting region formed in the upper end portion of the resilient support element, the second connecting region being movably engaged with the substantially ringed connecting end portion of the second biasing spring member.

As another exemplary mode of the invention, the biasing element may comprise: first and second biasing spring members disposed adjacent to the pair of lateral frame members, respectively. And, the movable connecting element may comprise: a first connecting region formed in the upper end portion of the resilient support element; a first rotating link having: an upper portion rotatably connected with afore-said one of the pair of lateral frame members; a lower portion with which the afore-said first connecting region of resilient support element and the afore-said one end portion of first biasing spring member are movably connected. Further. the movable connecting element may comprise: a second connecting region formed in the upper end portion of the resilient support element; a second rotating link having: an upper portion rotatably connected with the afore-said another of the pair of lateral frame members; and a lower portion with which the afore-said second connecting region of the resilient support element and the afore-said another end portion of the second biasing spring member are movably connected, As still another exemplary mode of the invention, the biasing element may comprise: first and second biasing spring members disposed adjacent to the pair of lateral frame members, respectively. And, the movable connecting element may comprise: a first arcuate hole defined at one of the pair of lateral frame members, the first arcuate hole extending substantially in a direction forwardly and backwardly of the seat back frame; and a first connecting region formed in the upper end portion of the resilient support element, the first connecting region being slidably engaged in the first arcuate hole, wherein the afore-said one of the first biasing spring member is connected with the first connecting region. Further, the movable connecting element may comprise: a second arcuate hole defined at the afore-said another of the pair of lateral frame members, the second arcuate hole extending substantially in a direction forwardly and backwardly of the seat back frame; and a second connecting region formed in the upper end portion of the resilient support element, the first connecting region being slidably engaged in the first arcuate hole; wherein the afore-said another of the first biasing spring member being connected with the second connecting region.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated one preferred embodiment of seat back structure generally designated by (10) in accordance with the present invention, which is provided with a headrest (20). Designation (SB) denotes a seat back of vehicle seat which has such seat back structure (10) therein and covered with an upholstery including a trim cover assembly (not shown) and a foam padding (30).

It is to be noted that the wording "forward" or "forwardly" refers to a forward side ($F^W$) facing forwardly of the seat back (SB), whereas the wording "backward" or "backwardly" refers to a backward side (BW) facing backwardly of the seat back (SB).

Figures 1, 2A, 2B:
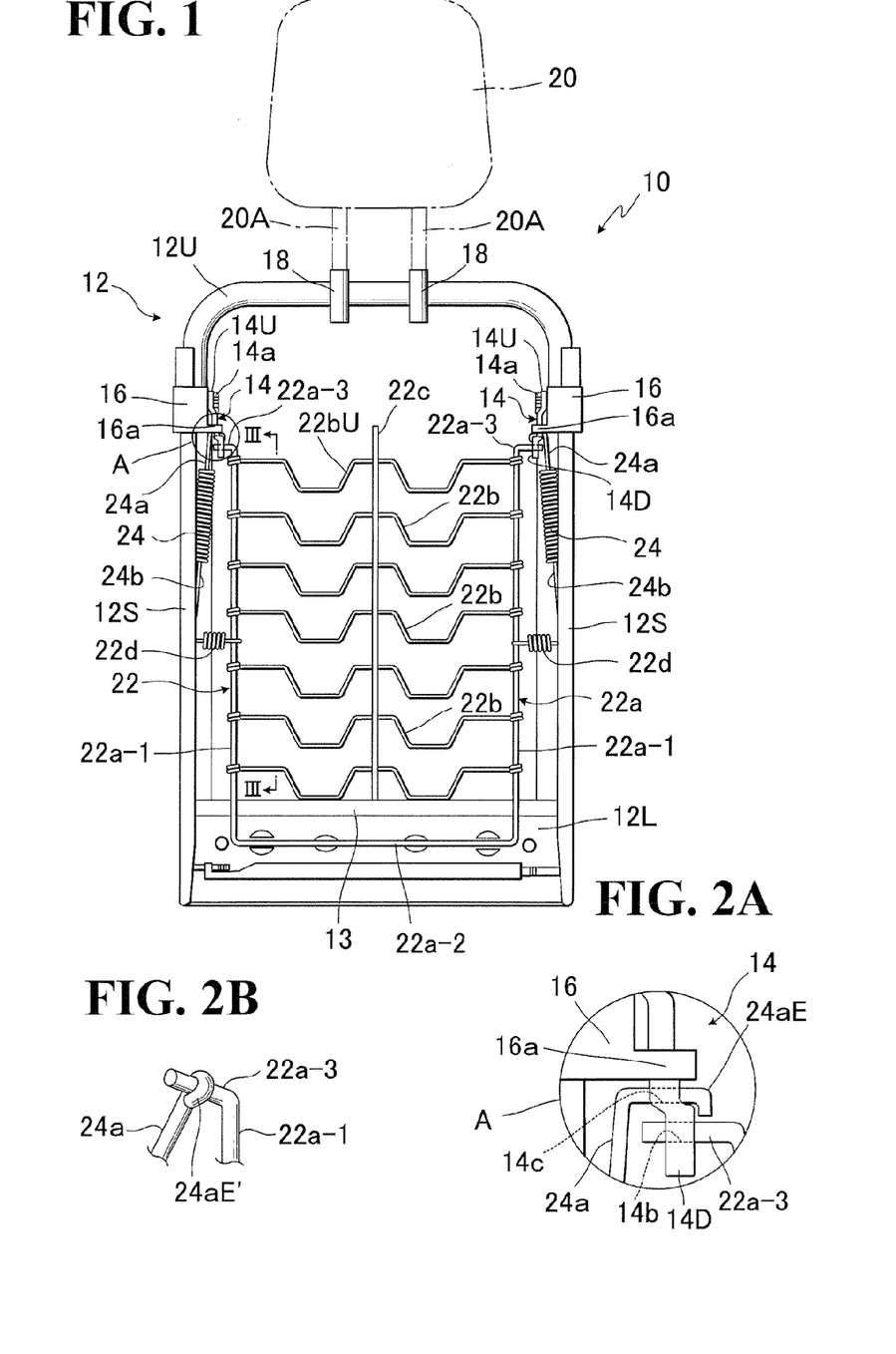
FIG. 1 is a schematic front view showing one exemplary embodiment of seat back structure in accordance with the present invention.
FIG. 2A is an enlarged view of an circled portion "A" in the FIG. 1, which shows one exemplary mode of a movable connecting means in the seat back structure.
FIG. 2B is a partly broken perspective view showing another exemplary mode of the movable connecting means.

As shown in FIG. 1, a seat back frame (12) to be provided in the seat back (SB) is of a substantially rectangular configuration which is formed by: an upper frame member (12U); a pair of lateral frame members (12S) (12S); and a lower frame member (12L).

Designation (13) denotes a known auxiliary cross bar member 13 which is extended horizontally between and firmly connected with the two lower regions respectively of the two lateral frame members (12S) (12S) in the vicinity of the lower frame member (12L). The auxiliary cross bar member 13 serves to prevent both two lateral frame members (12S) (12S) against breakage when an excessive great lateral load is applied thereto in the case of a lateral collision. In the present invention, such auxiliary cross bar member (13) is used for supportively receiving a lower region of a resilient support member (22) and limiting the backward displacement of that lower region of resilient support member (22), as will be described later.

In accordance with the present invention, it is to be noted that the headrest (20) is not any active headrest described in the description of prior art and thus not movable forwardly and backwardly towards and away a seat occupant's head, but the headrest (20) is simply mounted on the upper frame member (12U) of the seat back frame (12) so as to be prevented against forward and backward movements. In the shown embodiment, however, the headrest (20) is at the two stay portions (20A) (20A) thereof slidably supported in the respective two stay holders (18) (18) fixed on the upper frame member (12U). Thus, the headrest (20) is only movable in vertical direction via such stay holders (18) for height adjustment purpose for enabling a seat occupant to raise and lower the headrest (20) to a desired level, as very commonly known in the art.

As shown in FIG. 1, a resilient support member (22) is provided in the seat cushion frame (12). The illustrated resilient support member (22) itself is known in the art and formed by metallic wire materials having a certain resilient property (e.g. metallic spring materials) so as to have, defined therein, a substantially U-shaped wire frame (22a), a plurality of uneven cross wires (22b) (i.e. each having crank regions defined therein as shown), and a vertical central wire (22c). As shown, the uneven cross wire portions (22b) are extended between left- and right-side lateral wire frame portions (22a-1) (22a-1) of the wire frame (22a), while being each fixed at the midway region thereof to the vertical central wire (22c), so that all the cross wire portions (22b) are arrayed in an equidistant relation with one another by that central wire portion (22c). Such wire assembly configuration allows the resilient support member (22) per se to be resiliently warped and deformed sightly so as to properly support a back portion of seat occupant, substantially in conformity therewith. However, the resilient support member (22) is not limited to the illustrated resilient wire assembly configuration, but may be formed in other appropriate configuration from other suitable materials including synthetic resin materials or rubber materials.

In accordance with the present invention, a left-side upper horizontal end portion (22a-3) and a right-side upper horizontal end portion (22a-3) are formed integrally in the respective two upper ends of the left- and right-side lateral frame portions (22a-1) (22a-1) so as to extend horizontally and outwardly therefrom in a direction opposite to each other. As will be elaborated, those two upper horizontal end portions (22a-3) and (22a-3) have operative connection with a pair of left- and right-side biasing spring members (24) and (24) respectively.

It is noted that the left- and right-side upper end portions (22a-3) (22a-3) and the uppermost cross wire portion (22bU) constitute an upper end of the resilient support member (22). Defined opposite to such upper end (22a-3 and 22bU) in the resilient support member (22) is a lower cross wire portion (22a-2) of the wire frame (22a) which constitutes a lower end of the resilient support member (22).

Designations (22d) and (22d) denote left- and right-side support tension springs (i.e. horizontally-extending coil tension springs) adapted for resiliently supporting the left- and right-side lateral wire frame portions (22a-1) (22a-1), respectively. As seen in FIG. 1, the left-side support tension spring (22d) is horizontally extended and connected between a midway area of the left-side lateral wire frame portion (22a-1) and the left-side lateral frame member (12S), whereas likewise, the right-side support tension spring (22d) is horizontally extended and connected between a midway area of the right-side lateral wire frame portion (22a-1) and the right-side lateral frame member (12S). Hence, the resilient support member (22) is resiliently suspended by the two support tension springs (22d) (22d) within an inward space defined by the upper and two lateral frame members (12U) (12S) of seat back frame (12).

Figure 3:
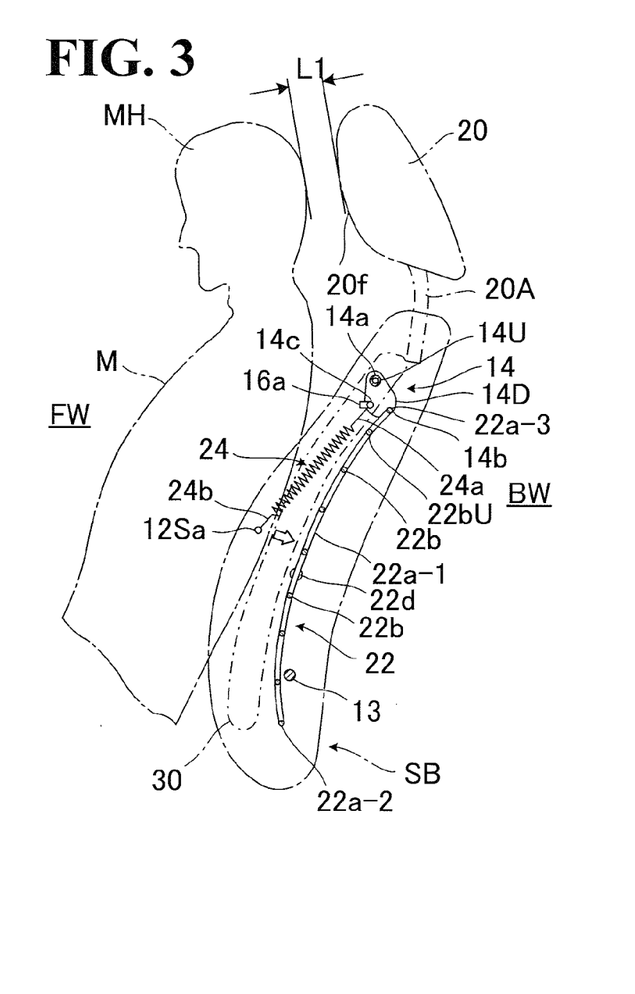
FIG. 3 is a diagram for explanatorily showing principal parts of the seat back structure as viewed from and along the line III-III in the FIG. 1.

As seen from FIGS. 1 and 3, the two lower end regions respective of the two lateral frame portions (22a-1) (22a-1), near to the afore-said lower cross wire portion (22a-2), are in a slidable contact with the auxiliary cross bar member (13), thereby preventing the lower end region of the resilient support member (22) against backward displacement. In other words, the auxiliary cross bar member (13) serves to allow the lower end region of resilient support member (22) to be displaced vertically thereon, while preventing the same against backward displacement. This means that the auxiliary cross bar member (13) is a lower support point, relative to which, substantially a whole of the resilient support member (22), excepting the lower end region thereof, is to be warped and displaced backwardly to serve the purposes of the present invention as will be described later. Of course, instead of such auxiliary cross bar member (13), the lower frame member (12L) of seat back frame (12) or other suitable cross member may be used in the same way as described above.

As seen from the side view of FIG. 3, the resilient support member (22) is arranged in the seat back (SB) in a backwardly inclined manner, such that the upper end (at 22a-3 and 22bU) thereof lies more backwardly than the lower end (at 22a-2) thereof, and the lower end region of such backwardly inclined resilient support member (22) extends downwardly past the auxiliary cross bar member (13), with the lower cross wire portion (22a-2) thereof being positioned a predetermined distance below and away from that auxiliary cross bar member (13).

As constructed above, it is to be seen that the resilient support member (22) itself is resiliently displaceable freely in fore-and-aft direction and can be displaced far backwardly of the seat back frame (12) if an excessive great backward load is applied thereto, because of no hindrance and no mechanical element being provided behind the resilient support member (22) as opposed to the prior arts stated in the description of prior art. This is one significant factor of the present invention, as will become apparent later.

Further, an elastic seat back padding (30) (e.g. foam padding) is disposed anteriorly of and placed on the resilient support member (22) within the seat back (SB), as indicated by the one-dot chain lines in FIG. 3, and it is observed that an upper body portion or back portion of the seat occupant (M) is resiliently supported on such juxtaposition of seat back padding (30) and resilient support member (22). In this regard, even when the back portion of seat occupant is rested on the seat back (SB), a whole of the resilient support member (22) is normally retained at a normal support position in the mariner shown in FIG. 3 for normally supporting the seat occupant's back portion. In particular, the intermediate region of the resilient support member (22) is resiliently supported by the two support tension springs (22d) (22d) to stably support a midway area of seat occupant's back portion, as can be seen in FIG. 3, unless an unusual great load overcoming the biasing forces of those particular support tension springs (22d) (22d) is applied to the resilient support member (22). Hence, normally, the seat occupant's upper body portion is stably supported by the resilient support member (22) and padding (30). Of course, the two support tension springs (22d) as well as the resilient support member (22) will be resiliently warped and deformed backwardly to a tolerable degree for normal resilient support effect by the following ordinary loads and pressures: a weight of the seat occupant (M), vibrations of vehicle running on a rough or normal road, some rough actions of the seat occupant (M), or the like.

With the above-described basic arrangements, in accordance with the present invention, it is a basic inventive principle that, when a rear-end collision occurs, upon receiving a backward excessive great load from the seat occupant (M) under inertia, the resilient support member (22) is automatically displaced far backwardly from the normal support position to thereby displace the back portion of seat occupant (M) far backwardly to the extent that a head (MH) of the seat occupant (M) is quickly brought to a point close to the unmoved headrest (20) stated previously, prior to the head (MH) being pressed against that headrest (20). Thus, immediately subsequent thereto, the seat occupant's head (MH) is gently received by the headrest (20), with no harmful impact given to the head (MH), thereby preventing damage of the seat occupant's neck, such as a whiplash injury. In particular, in that case, the upper region of the resilient support member (22) is displaced far more backwardly than the lower region thereof, due to the two tension springs (22d) acting to limit the backward displacement of the midway and lower regions of resilient support member (22) and also due to the lower end region of the resilient support member (22) being prevented by the lower cross member (13) against backward displacement. Hence, the seat occupant's head (MH) is quickly brought to a point close to the headrest (20) in the case of rear-end collision.

Figure 4:
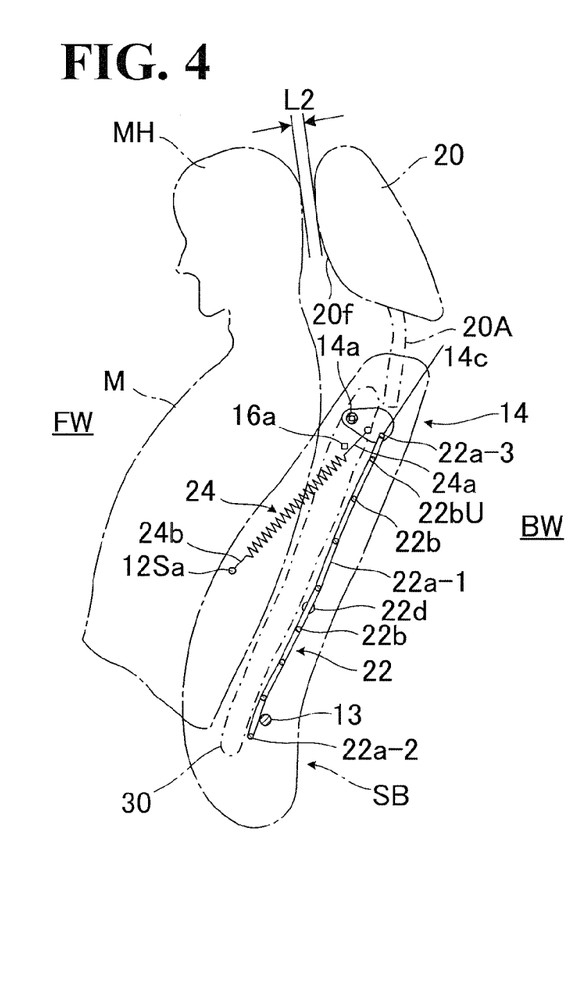
FIG. 4 is a diagram for explanatorily showing actions and movements of the principal parts as viewed from and along the line III-III in the FIG. 1.

In view of the foregoing, basically, it is necessary to insure that the resilient support member (22) is normally retained at the normal support position shown in FIG. 3 against the above-discussed far backward displacement, while in the case of rear-end collision, the resilient support member (22) is immediately subjected to such far backward displacement, upon receiving the backward excessive great load (see the arrow in FIG. 3) from the seat occupant (M) under inertia, as can be seen in FIG. 4.

To achieve such effects, generically stated, a pair of left- and right-side biasing spring members (24) and (24) (i.e. vertically extending coil tension springs) are provided to normally bias the resilient support member (22) to the normal support position shown in FIG. 3 for resiliently supporting a back portion of seat occupant (M), but, upon occurrence of rear-end collision, an excessive great load (see the arrow in FIG. 3) overcoming the biasing force of such biasing spring members (24) is applied from the seat occupant (M) to the resilient support member (22) via the seat back padding (30), with the result that, as understandable in FIG. 4, both two biasing spring members (24) (24) are resiliently stretched long, thereby permitting the resilient support member (22) to be displaced backwardly away from the normal support position shown in FIG. 3 in a direction toward the backwardly displaced position shown in FIG. 4. In particular, the upper region of the resilient support member (22) is displaced far more backwardly than the lower region thereof.

It is noted here that a biasing force or coefficient of elasticity of the biasing spring member (24) is preset to such a degree that the biasing spring member (24) per se is very slightly contractible and extendible by such normal load as: a weight of the seat occupant (M); vibrations of vehicle running on a rough or normal road; or some rough actions of the seat occupant (M), while by contrast, upon receiving the excessive great load discussed above in the case of rear-end collision, the biasing spring member (24) is stretched long to the extent of permitting the resilient support member (22) to displace far backwardly to reach the backwardly displaced position as shown in FIG. 4.

In this context, as understandable from FIGS. 1 and 3, a lower end portion (24b) of the left-side biasing spring member (24) is securely engaged in a hole (12Sa) formed in the left-side lateral frame member (12S) of seat cushion frame (12). Though not clearly shown, it is to be understood that a lower end portion (24b) of the right-side biasing spring members (24) is also securely engaged in an unshown hole formed in the right-side lateral frame member (12S), likewise as in the left-side biasing spring member (24).

Further, in accordance with the present invention, generically stated, the two upper end portions (24a) (24a) respectively of the left- and right-side biasing spring members (24) (24) are operatively connected, via a movable connecting means, with the left- and right-side horizontal end portions (22a-3) (22a-3) of the resilient support member (22), respectively.

With regard to the foregoing movable connecting means, a description will now be made of two exemplary embodiments thereof, with reference to FIGS. 2A and 2B in conjunction with FIGS. 3 and 4. Since the left and right half regions of the seat back structure (10) are entirely identical to each other in terms of construction and constituent parts, a specific description be made mainly as to the left half area of the resilient support member (22), the left-side lateral frame member (12S), and several parts provided in that left-side lateral frame member (12S), for the sake of simplicity.

At first, as suggested in FIG. 2B, the movable connecting means may be embodied by a ringed connecting end portion (24aE'). Namely, the ringed connecting end portion (24aE') may be formed integrally in a free end of the upper end portion (24a) each of the left- and right-side biasing spring members (24) and (24). As shown, such ringed connecting end proton (24aE') is rotatably engaged about each of the left- and right-side horizontal end portions (22a-3) (22a-3) of resilient support member (22), thereby establishing an operative connection between the biasing spring member (24) and the resilient support member (22).

As the left and right regions of the seat back structure (10) are entirely identical to each other in terms of construction and constituent parts, a specific description will now be made only of the left-side ringed connecting end portion (24aE') and other left-side associated parts only, for the sake of simplicity. It is also to be understood that the present first mode will be explained on the basis of the FIGS. 1, 3 and 4 which is directed to another alternative mode to be described later, and therefore, only parts and members associated with the present first mode will be described, even though the parts and members associated with another mode are illustrated in the FIGS. 1, 3 and 4.

Normally, as shown in FIG. 3, under the biasing force of the biasing spring member (24), the resilient support member (22) is resiliently retained at the normal support position with respect to the seat back frame (12). But, in the case of rear-end collision, an excessive great load (see the arrow in FIG. 3) overcoming the biasing force of spring member (24) is applied form the seat occupant (M) to the resilient support member (22), with the result that substantially a whole of the resilient support member (22) is resiliently deformed or warped backwardly relative to the lower end region (at 22a-2) thereof which is in a slid able contact on the lower cross bar member (13), and the resilient support member (22) continues to be displaced backwardly. With such backward displacement of resilient support member (22), the basing spring member (24) is resiliently stretched long, whereby the resilient support member (22), movably connected at the ringed connecting end portion (24aE') thereof with that biasing spring member (24), is displaced from the normal support position shown in FIG. 3 far backwardly towards the backwardly displaced position shown in FIG. 4. Due to such actions, the back portion of seat occupant (M) received on the resilient support member (22) is also simultaneously displaced in the likewise backward direction, so that the seat occupant's head (MH) is quickly brought to a point close to the headrest (20) before being directly pressed against the headrest (20), wherein the headrest (20) is basically unmoved and in particular unmovable in the forward and backward directions relative to the seat back (SB) as stated previously. In other words, taking a comparative view between FIGS. 3 and 4, it is to be seen that the seat occupant's head (MH), normally positioned away a certain distance (L1) from the unmoved headrest (20), is immediately brought to a point close to the frontal surface (20f) of that particular headrest (20), with a reduced small distance (L2) therebetween, prior to the head (MH) being directly pressed against the headrest (20). Thus, immediately subsequent thereto, the seat occupant's head (MH) is gently received by the headrest (20) due to such small distance (L2), with no harmful impact given to the head (MH), so that damage of the seat occupant's neck, such as a whiplash injury, is prevented.

Alternatively, as can be seen from FIGS. 1, 2A and 3, the movable connecting means may be embodied by a pair of left- and right-side rotating links (14) and (14). In this alternative mode, in brief, the resilient support member (22) is at the two horizontal end portions (22a-3) (22a-3) thereof operatively connected via such two rotating links (14) (14) with the two biasing spring members (24) (24) to achieve the same actions and effects as described in the aforementioned ringed connecting end portion (24aE').

Specifically, as shown in FIGS. 1 and 3, the left-side rotating link (14) is at the upper end region (14U) thereof rotatably connected via a pin (14a) to a left-side support bracket (16) fixed to the upper region of the left-side lateral frame member (12S). As best seen in FIG. 2A, a first connecting hole (14b) and a second connecting hole (14c) are formed in the lower end region (14D) of the left-side rotating link (14). Rotatably supported in the first connecting hole (14b) is the left-side horizontal end portion (22a-3) of the resilient support member (22), whereas, rotatably supported in the second connecting hole (14c) is the connecting end (24aE) of the upper end portion (24a) of the left-side biasing spring member (24). Likewise, another right-side rotating link (14) is at the upper end region (14U) thereof rotatably connected via a pin (14a) to a right-side support bracket (16) fixed to the upper region of the right-side lateral frame member (12S). In this regard, while not clearly shown, it is to be understood that the right-side horizontal end portion (22a-3) of resilient support member (22) is rotatably supported in another first connecting hole (at 14b) of the right-side rotating link (14), whereas a connecting end (24aE) of the upper end portion (24a) of the left-side biasing spring member (24) is rotatably supported in another second connecting hole (at 14c).

Accordingly, normally, as understandable from FIGS. 1 and 4, the left- and right-side rotating links (14) (14) are biasingly caused by the respective left- and right-side biasing spring members (24) (24) to rotate clockwise about the corresponding two pins (14a) (14a) and, with such biasing action, both two rotating links (14) (14) are normally kept in contact with the two stopper pieces (16a) (16a), respectively, against further clockwise rotation, wherein the two stopper pieces (16a) (16a) are formed integrally with the left- and right-side brackets (16) (16), respectively. Under that state, the resilient support member (22) is normally retained at the normal support position as shown in FIG. 3. Since the left and right half regions of the seat back structure (10) are entirely identical to each other in terms of construction and constituent parts, a specific description be made of how the resilient support member (22) is displaced via the left-side rotating link (14) only, for the sake of simplicity.

As seen in FIG. 3 in conjunction with FIG. 1, under the biasing force of the biasing spring member (24) and due to the provision of the stopper piece (16a), the resilient support member (22) is resiliently retained at the normal support position with respect to the seat back frame (12). But, in the case of rear-end collision, an excessive great load (see the arrow in FIG. 3) overcoming the biasing force of spring member (24) is applied form the seat occupant (M) to the resilient support member (22). As a result thereof, substantially a whole of the resilient support member (22) is resiliently deformed or warped backwardly relative to the lower end region (at 22a-2) thereof which is in a slidable contact on the lower cross bar member (13), and the resilient support member (22) continues to be displaced backwardly. As understandable from FIGS. 3 and 4, with such backward displacement of resilient support member (22), the rotating link (14) coupled therewith is rotated anticlockwise about the pin (14a) in a direction backwardly, of the seat back frame (12), which in turn causes the biasing spring member (24) to stretch long, whereby the resilient support member (22), connected via the rotating link (14) with that biasing spring member (24), is displaced from the normal support position shown in FIG. 3, far backwardly, while being displaced upwardly at the same time, in a direction toward the backwardly displaced position shown in FIG. 4. Due to such actions, the back portion of seat occupant (M) received on the resilient support member (22) is also simultaneously displaced in the likewise backward and upward directions, so that the seat occupant's head (MH) is quickly brought to a point close to the headrest (20) before being directly pressed against the headrest (20).

In other words, taking a comparative view between FIGS. 3 and 4, it is to be seen that the seat occupant's head (MH), normally positioned away a certain distance (L1) from the unmoved headrest (20), is immediately brought to a point close to the frontal surface (20f) of that particular headrest (20), with a reduced small distance (L2) therebetween, prior to the head (MH) being directly pressed against the headrest (20). Thus, immediately subsequent thereto, the seat occupant's head (MH) is gently received by the headrest (20) due to such small distance (L2), with no harmful impact to the head (MH), so that damage of the seat occupant's neck, such as a whiplash injury, is prevented. In the present mode, taking into account the backward and upward displacement of resilient support member (22) and seat occupant's upper body portion thereon, the headrest (20) should preferably be of the illustrated forwardly inclined type in order to insure that the seat occupant's head (MH) is brought to the illustrated point close to the headrest (20) with the optimum small distance (L2) therebetween.

In this context, it is seen that each rotating link (14) has its rotation center at the pin (14a) and also has a connecting point at the connecting hole (14b), wherein, at that connecting point, the upper horizontal end portion (22a-3) of the resilient support member (22) is pivotally connected via the connecting hole (14b) with the rotating link (14b). It is important that a distance between such rotation center (at 14a) and such connecting point (at 14b) be properly determined such that, with rotation of the rotating link (14), the upper end (i.e. the upper horizontal end portion 22a-2) of the resilient support member (22) will be swingingly displaced along the circumference of a circle having its center at the point (14a) so as to provide an appropriate arcuate path along which the resilient support member (22) is to be displaced backwardly and upwardly to insure that the seat occupant's head (MH) is brought to an optimum point close to the headrest (20) as shown in FIG. 4.

Reference is made to FIGS. 5 to 8 which shows a further alternative embodiment of the movable connecting means. It is to be noted that the seat back structure (10) shown in these FIGS. 5 to 8 is basically identical to the seat back structure (10) shown in FIGS. 1, 3 and 4, except that the movable connecting means discussed above is embodied by a pair of left- and right-side guide plate members (114) and (114). Hence, any detailed description about the parts and elements commonly used in the present and foregoing embodiments is omitted for the sake of simplicity in description, and all like designations to be used hereinafter correspond to all like designations that has been used in the previously described embodiment.

In the present alternative embodiment, in brief, the resilient support member (22) is at the two horizontal end portions (22a-3) (22a-3) thereof operatively connected via such two guide plate members (114) (114) with the two biasing spring members (24) (24), respectively, to achieve the same actions and effects as described in the foregoing embodiments. Likewise as in the foregoing second embodiment, the headrest (20) is of the forwardly inclined type as can be seen in FIG. 7 for the same effect and purpose as described in the second embodiment.

Figures 5, 6:
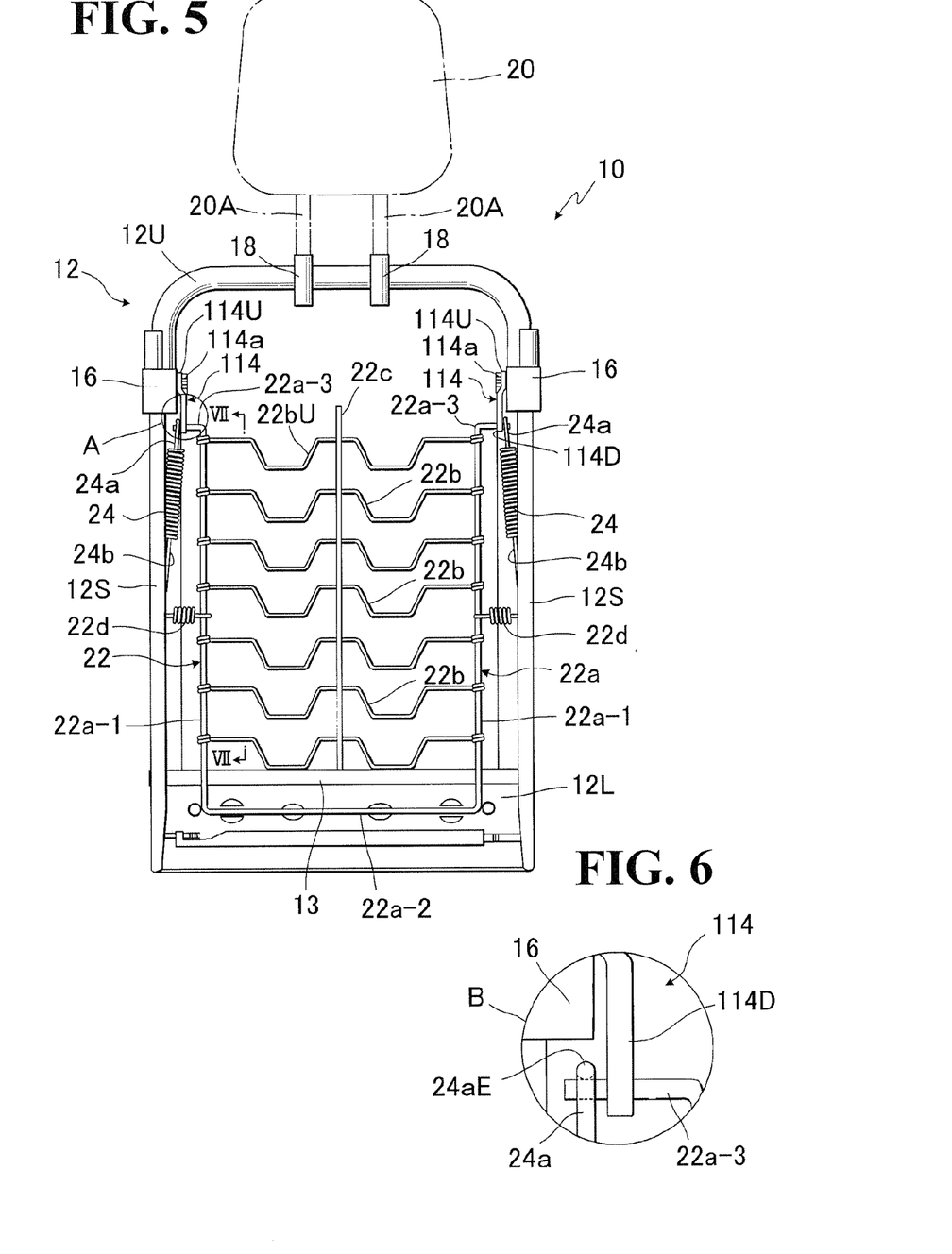
FIG. 5 is a schematic front view showing another exemplary embodiment of seat back structure in accordance with the present invention.
FIG. 6 is an enlarged view of an circled portion "B" in the FIG. 5, which shows still another exemplary mode of the movable connecting means.
Figure 7:
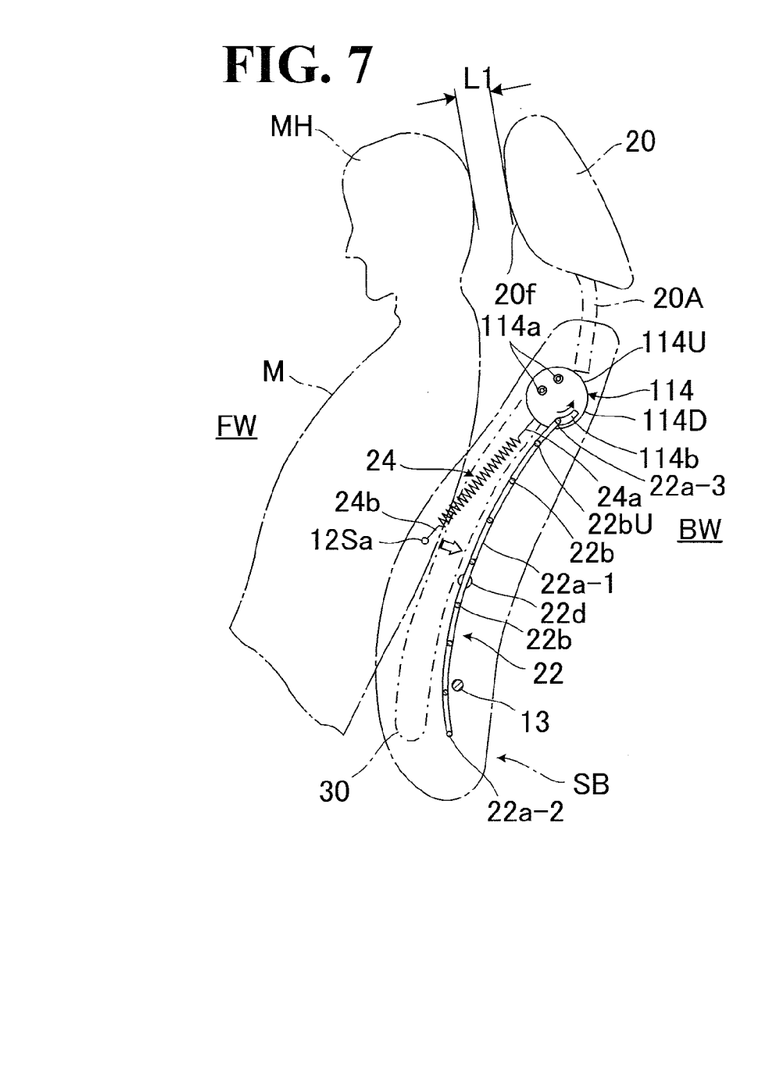
FIG. 7 is a diagram for explanatorily showing actions and movements of the principal parts as viewed from and along the line VII-VII in the FIG. 5.
Figure 8:
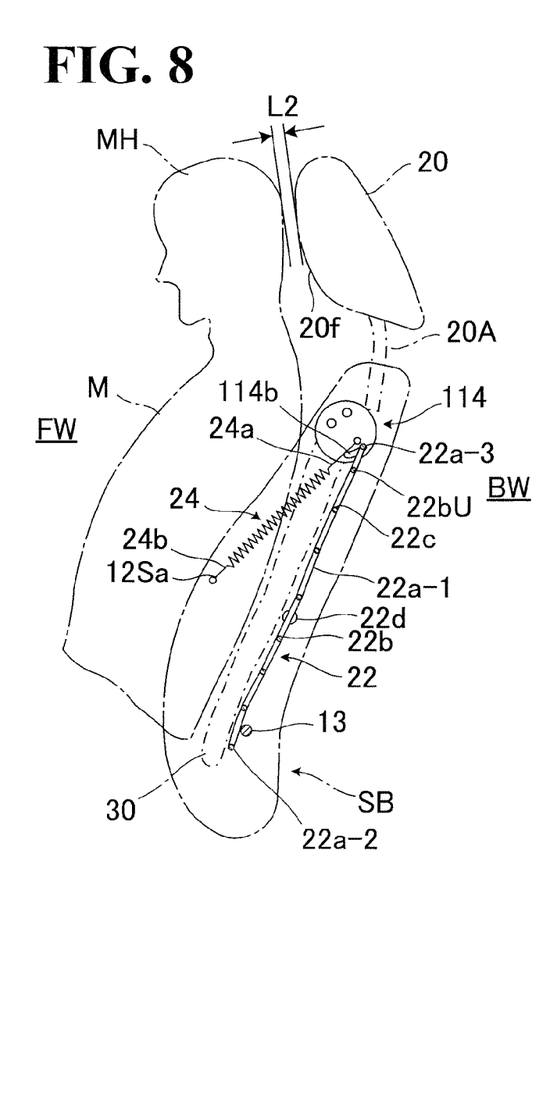
FIG. 8 is a diagram for explanatorily showing actions and movements of the principal parts as viewed from and along the line VII-VII in the FIG. 5.

Specifically, as shown in FIGS. 5, 7 and 6, the left-side guide plate member (114) is at the upper end region (114U) thereof fixedly attached by two pins (114a) (114a) to a left-side support bracket (16) fixed to the upper region of the left-side lateral frame member (12S). As seen in FIG. 7, an arcuate hole (114b) is formed in the lower end region (14D) of the left-side guide plate (114), and, slidably inserted in that arcuate hole (114b) is the left-side upper horizontal end portion (22a-3) of the resilient support member (22). Namely, as clearly understandable from FIGS. 5 and 6, the upper horizontal end portion (22a-3) passes through the arcuate hole (114b) so as to project on the outward side of the guide plate (114) facing the left-side lateral frame member (12S). And, as can be seen in FIG. 6, rotatably engaged about the thus-projected end part of the upper horizontal end portion (22a-3) is a hooked or ringed end (24aE) of the left-side biasing spring member (24). Hence, the upper horizontal end portion (22a-3) of resilient support member (22) is slidingly movable in and along the arcuate hole (114b), as shown in FIGS. 7 and 8.

Another right-side guide plate (114) identical in shape and structure to the foregoing left-side guide plate (114) is provided. Likewise as in the left-side guide plate (114), the right-side guide plate (114) is at the upper end region (114U) thereof fixedly attached by two pins (at 114a and 114a) to a right-side support bracket (16) fixed to the upper region of the right-side lateral frame member (12S). Also, though not clearly shown, it is to be understood that an arcuate hole identical to the afore-said arcuate hole (114b) is formed in a lower end region (114D) of the right-side guide plate (114), and that slidably inserted in that arcuate hole is the right-side upper horizontal end portion (22a-3) of resilient support member (22), such that the upper horizontal end portion (22a-3) passes through the arcuate hole to project on the outward side of guide plate (114) facing the right-side lateral frame member (12S). It is further to be understood that a free end of the right-side biasing spring member (24), similar to the afore-said hooked or ringed end (24aE), is rotatably engaged about the thus-projected end part of the right-side upper horizontal end portion (22a-3), and that the upper horizontal end portion (22a-3) of the right-side resilient support member (22) is slidingly movable in and along the arcuate hole in the same manner as shown in FIGS. 7 and 8.

As constructed above, as understandable from FIG. 7, the left- and right-side upper horizontal end portions (22a-3) (22a-3) of the resilient support member (22) are normally biasingly caused by the respective left- and right-side biasing spring members (24) (24) to be in contact with the respective two lower edges of two arcuate holes (114b) which are respectively formed in the two guide plate members (114) (114), whereby the resilient support member (22) is normally retained at the normal support position shown in FIG. 7.

As the left and right regions of the seat back structure (10) are entirely identical to each other in terms of construction and constituent parts, a specific description be made only of how the resilient support member (22) is displaced via the left-side guide plate member (114).

Normally, as seen in FIG. 7 in conjunction with FIG. 5; under the biasing force of the biasing spring member (24), the resilient support member (22) is resiliently retained at the normal support position with respect to the seat back frame (12). But, in the case of rear-end collision, an excessive great load (see the arrow in FIG. 7) overcoming the biasing force of spring member (24) is applied form the seat occupant (M) to the resilient support member (22). As a result thereof, substantially a whole of the resilient support member (22) is resiliently deformed or warped backwardly relative to the lower end region (at 22a-2) thereof which is in slidable contact on the lower cross bar member (13) and continues to be displaced backwardly. Then, as understandable from FIGS. 7 and 8, with such backward displacement of resilient support member (22), the upper horizontal end portion (22a-3) of that resilient member (22) is moved backwardly and upwardly in and along the arcuate hole (114b), which in turn causes the biasing spring member (24) to stretch long, whereby the resilient support member (22), which is connected via the guide plate (114) with that biasing spring member (24), is displaced from the normal position shown in FIG. 7 far backwardly, while being displaced upwardly at the same time, in a direction toward the backwardly displaced position shown in FIG. 8. Due to such actions, the back portion of seat occupant (M) received on the resilient support member (22) is also simultaneously displaced in the likewise backward and upward directions, so that the seat occupant's head (MH) is quickly brought to a point close to the unmoved headrest (20) before being directly pressed against the headrest (2). In other words, taking a comparative view between FIGS. 7 and 8, the seat occupant's head (MH), which is normally positioned away a distance (L1) from the unmoved headrest (20), is quickly brought to a point close to the frontal surface (20f) of that particular headrest (20), with a reduced small distance (L2) therebetween, prior to the head (MH) being directly pressed against the headrest (20). Thus, immediately subsequent thereto, the seat occupant's head (MH) is gently received by the headrest (20) due to such small space (L2), so that no harmful impact is given to the head (MH) and therefore, damage of the seat occupant's neck, such as a whiplash injury, is prevented.

It is noted that the arcuate hole (114b) in the present third embodiment substantially corresponds to the previously stated arcuate path along which the resilient support member's upper end portion (at 22a-3) is to displaced with rotation of the rotating links (14) as in the previous second embodiment. Therefore, in both second and third embodiments, the resilient support member (22) is to be displaced along a predetermined arcuate path by such a guide means as the rotating links (14) or arcuate hole (114b), thereby insuring smooth and quick backward-and-upward displacement of the resilient support member (22) to positively bring the seat occupant's head (MH) to a point close to the forwardly inclined type of headrest (20) as shown in FIGS. 4 and 8, wherein, again, the headrest (20) is in unmoved state as stated previously.

In the present third embodiment, the upper edge of such arcuate hole (114b) provides a limit to the upward and backward displacement of the resilient support member (22) because the upper horizontal end portion (22a-3) of that resilient support member (22) being slidingly moved along the arcuate hole (114b) is eventually contacted with the upper edge of the arcuate hole (114) and thereby prevented against further upward displacement. Thus, an upper limit is definitely provided to the backward and upward displacement of resilient support member (22), which advantageously insures that the seat occupant's upper body portion on the resilient support member (22) is stopped at a predetermined point where his or her head (MH) is positioned at the previously discussed point close to the headrest (20), with the optimum small space (L2) provided therebetween.

As can be appreciated from the descriptions above, in accordance with the present invention, the headrest (20) is not an active headrest movable forwardly and backwardly, but unmovable in the forward and backward directions and further, the known resilient support member (22) is simply disposed in the known seat back frame (12), with such a simplified arrangement that the upper end proton of that resilient support member (22) is operatively connected with the biasing spring members (24) via the movable connecting means (at 24aE', 14 or 114). With this construction, in the case of rear-end collision, a seat occupant's back portion is displaced far backwardly under inertia together with the resilient support member (22) which is being also warped far backwardly by an excessive great load applied thereto from the seat occupant, thereby causing the biasing spring member (24) to stretch long, whereby the resilient support member (22) is displaced backwardly and upwardly via the movable connecting means (at 24aE', 14 or 114) so that the seat occupant's head (MH) is quickly brought to a point close to the headrest (20), hence preventing damage of seat occupant's neck, such as whiplash injury. Therefore, there is no need to assemble a pressure receiving member behind the resilient support member (22) and no need to incorporate an active headrest system wherein the headrest is movable forwardly to a point close to a seat occupant head in response to backward displacement of the pressure receiving member, as found in the prior art. As such, a seat occupant can feel a deep cushiony support touch at his or her back portion since no such pressure receiving member is provided behind the resilient support member (22), and the seat back can be easily assembled with small number of parts, at greatly reduced costs involved. In addition, because of the very simplified construction, the seat back itself can be made small in size and reduced in weight.

While having described the present invention thus far, it is to be understood that the invention is not limited to the illustrated embodiment, but any modification, addition and replacement may be applied thereto, without departing from the scopes of the appended claims.

What is claimed is:

1. A structure of a seat back of a vehicle seat in combination with a headrest unmovable forwardly and backwardly of the seat back, comprising:
   a seat back frame having: an upper frame member on which said headrest is mounted; a pair of lateral frame members; and a lower cross frame member;
   an elastic seat back padding;
   a resilient support element resiliently supported in said seat back frame, said resent support element being adapted to resiliently support said elastic seat back padding as well as a back portion of a seat occupant to be seated on the vehicle seat, said resilient support element having an upper end portion;
   a biasing element having:
      a first portion disposed at an upper region of said seat back frame in vicinity of said upper frame member of the seat back frame, said first portion being movably connected, via a movable connecting element, with said upper end portion of said resilient support element; and
      a second portion connected with another region of said seat back frame, other than said upper region thereof;
      said upper end portion of said resilient support element being normally biased by a biasing force of said biasing element to such an extent that the resilient support element is retained at a normal support position for normally supporting said back portion of said seat occupant, with a head of the seat occupant being positioned away a certain distance from said headrest,
   wherein, in case of rear-end collision, upon receiving an excessive great load applied via said seat back padding from said seat occupant who is pressed backwardly under inertia against the seat back, said resilient support element is forcibly displaced far backwardly from said normal support position, together with said back portion of said seat occupant, which overcomes said biasing force of said biasing element, thereby causing said biasing element to resiliently stretch to permit said upper end portion of said resilient support element to be displaced backwardly and upwardly, via said movable connecting element, with respect to said seat back frame, so that a head of said seat occupant is brought to a point close to said headrest, thereby reducing said certain distance between said head and said headrest, prior to said head of said seat occupant being, directly pressed against said headrest.

2. The structure of a seat back of a vehicle seat as claimed in claim wherein said resilient support element has a lower end portion which is in a slidable contact upon said lower cross frame member, and wherein, in said case of rear-end collision, substantially a whole of said resilient support element, including said upper end portion of the resilient support element, is displaced far backwardly and upwardly relative to said lower cross frame member, with said lower end portion of said resilient support element being slidingly moved on said lower cross frame member.

3. The structure of a seat back of a vehicle seat as claimed in claim 1, wherein said biasing element comprises:
a first biasing spring member disposed adjacent to one of said pair of lateral frame members, said first biasing spring member having:
one end portion corresponding to said first portion of said biasing element, and
another end portion corresponding to said second portion of said biasing element, said another end portion being connected with said one of said pair of lateral frame members; and
a second biasing spring member disposed adjacent to another of said pair of lateral frame members, said second biasing spring member having:
one end portion corresponding to said first portion of said biasing element, and
another end portion corresponding to said second portion of said biasing element, said another end portion being connected with said another of said pair of lateral frame members; and
wherein said movable connecting element comprises:
a substantially ringed connecting end portion formed in said first biasing spring member; and
a first connecting region formed in said upper end portion of said resilient support element, said first connecting region being movably engaged with said substantially ringed connecting end portion of said first biasing spring member; and
a substantially ringed connecting end portion formed in said second biasing spring member; and
a second connecting region formed in said upper end portion of said resilient support element, said second connecting region being movably engaged with said substantially ringed connecting end portion of said second biasing spring member.

4. The structure of a seat back of a vehicle seat as claimed in claim 3, wherein said first biasing spring member is a first coil tension spring connected between said first connecting end region of said resilient support element and said one of said pair of lateral frame members, and wherein said second biasing spring member is a second coil tension spring connected between said second connecting end region of said resilient support element and said another of said pair of lateral frame members.

5. The structure of a seat back of a vehicle seat as claimed in claim 1, wherein said biasing element comprises:
a first biasing spring member disposed adjacent to one of said pair of lateral frame members;
said first biasing spring member having:
one end portion corresponding to said first portion of said biasing element; and
another end portion corresponding to said second portion of said biasing element, said another end portion being connected with said one of said pair of lateral frame members; and
a second biasing spring member disposed adjacent to another of said pair of lateral frame members;
said second biasing spring member having
one end portion corresponding to said first portion of said biasing element; and
another end portion corresponding to said second portion of said biasing element, said another end portion being connected with said another of said pair of lateral frame members, wherein said movable connecting element comprises:
a first connecting region formed in said upper end portion of said resilient support element;
a first rotating link having:
an upper portion rotatably connected with said one of said pair of lateral frame members; and
a lower portion with which said first connecting region of said resilient support element and said one end portion of said first biasing spring member are movably connected;
a second connecting region formed in said upper end portion of said resilient support element; and
a second rotating link having:
an upper portion rotatably connected with said another of said pair of lateral frame members; and
a lower portion with which said second connecting region of said resilient support element and said another end portion of said second biasing spring member are movably connected, and
wherein, in case of rear-end collision, upon receiving an excessive great load applied via said seat back padding from said seat occupant who is pressed backwardly under inertia against the seat back, said resilient support element is forcibly displaced far backwardly from said normal support position, together with said back portion of said seat occupant, which overcomes said biasing force of said first and second biasing spring members, thereby causing said first and second biasing spring members to resiliently stretch, while causing backward and upward rotation of both said first and second rotating links, whereby said upper end portion of said resilient support element is displaced backwardly and upwardly with respect to said seat back frame, so that a head of said seat occupant is brought to a point close to said headrest, thereby reducing said certain distance between said head and said headrest, prior to said head of said seat occupant being directly pressed against said headrest.

6. The structure of a seat back of a vehicle seat as claimed in claim 1, wherein said biasing element comprises:
a first biasing spring member disposed adjacent to one of said pair of lateral frame members;
said first biasing spring member having:
one end portion corresponding to said first portion of said biasing element; and
another end portion corresponding to said second portion of said biasing element, said another end portion being connected with said one of said pair of lateral frame members; and
a second biasing spring member disposed adjacent to another of said pair of lateral frame members;
said second biasing spring member having
one end portion corresponding to said first portion of said biasing element; and
another end portion corresponding to said second portion of said biasing element, said another end portion being connected with said another of said pair of lateral frame members,
wherein said movable connecting element comprises:
a first arcuate hole defined at said one of said pair of lateral frame members, said first arcuate hole extending substantially in a direction forwardly and backwardly of the seat back frame;
a first connecting region formed in said upper end portion of said resilient support element, said first connecting region being slidably engaged in said first arcuate hole; said one of said first biasing spring member being connected with said first connecting region;

a second arcuate hole defined at said another of said pair of lateral frame members, said first arcuate hole extending substantially in a direction forwardly and backwardly of the seat back frame;

a second connecting region formed in said upper end portion of said resent support element, said second connecting region being slidably engaged in said first arcuate hole; said another of said first biasing spring member being connected with said second connecting region; and wherein, in case of rear-end collision, upon receiving an excessive great load applied via said seat back padding from said seat occupant who is pressed backwardly under inertia against the seat back, said resilient support element is forcibly displaced far backwardly from said normal support position, together with said back portion of said seat occupant, which overcomes said biasing force of said first and second biasing spring members, thereby causing said first and second biasing spring members to resiliently stretch, while causing said first and second connecting regions of said resilient support element to slidingly move in and along said first and second arcuate holes, respectively, in backward and upward directions, whereby said upper end portion of said resilient support element is displaced backwardly and upwardly with respect to said seat back frame, so that a head of said seat occupant is brought to a point close to said headrest, thereby reducing said certain distance between said head and said headrest, prior to said head of said seat occupant being directly pressed against said headrest.

* * * * *